(12) United States Patent
Hsu et al.

(10) Patent No.: US 7,966,139 B2
(45) Date of Patent: Jun. 21, 2011

(54) APPARATUS FOR MONITORING THE MAINTENANCE OF SYSTEMS IN A NUCLEAR POWER PLANT

(75) Inventors: Pi-lin Hsu, Taoyuan (TW); Shang-Tzu Ho, Taoyuan (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 12/010,309

(22) Filed: Jan. 23, 2008

(65) Prior Publication Data

US 2011/0010119 A1    Jan. 13, 2011

(51) Int. Cl.
*G06F 19/00*    (2006.01)
*G21C 7/00*    (2006.01)

(52) U.S. Cl. .......................................... 702/61; 376/245

(58) Field of Classification Search ................... 702/61, 702/185; 376/245, 254
See application file for complete search history.

(56) References Cited

U.S. PATENT DOCUMENTS

| 4,632,802 | A  | * | 12/1986 | Herbst et al. ................. 376/216 |
| 6,594,620 | B1 | * | 7/2003  | Qin et al. ...................... 702/185 |
| 7,532,698 | B2 | * | 5/2009  | Mertyurek et al. ........... 376/245 |

* cited by examiner

*Primary Examiner* — Bryan Bui
(74) *Attorney, Agent, or Firm* — Jackson IPG PLLC; Demian K. Jackson

(57) ABSTRACT

An apparatus is disclosed for monitoring the maintenance of a plant that is equipped with various systems. The apparatus includes a screening module, a classifying module, a performance criteria-setting module, an availability data module, a reliability data module, a real-time monitoring module, a performance-assessing module and a special monitoring module.

19 Claims, 10 Drawing Sheets

MSMRDB

- FLOW CHART
- Mail Log
- Guidelines
- Function Scope
- Function Scoping Log
- Function Equipment
- Function Failure
- Unavailability
- Performance Evaluation
- (a)(l) Status
- MREP Meeting
- Quit

11

Function Scoping Information

[ Edit ]  [ Delete ]  [ Quit ]

Function Information

Sys ID : AB
Sys Name : Main steam system
Fun ID : AB-01
Fun Name : power generation
Fun Desc : Convey steam generated in the steam generators to the Turbine-Generator and (Auxiliary Steam System、steam seal system、MSR、TDAFWS, etc) for power generation
Sys Eng : Gao Qi
ME : Chien Shiuh-qing   EI : Fong Wing-di   IN : Huang Cong-an   MS : Wu Jyun-liang   OT : Hong Chen-jung Scoping Information

*MSMRDB*

| FLOW CHART |
| Mail Log |
| Guidelines |
| Function Scope |
| Function Scoping Log |
| Function Equipment |
| Function Failure |
| Unavailability |
| Performance Evaluation |
| (a)(1) Status |
| MREP Meeting |
| Quit |

152

Resp. Eng. determination

● Function Failure      ○ Non-Function Failure

Justification by Resp. Eng.

Non-Function Failure Checklist

☐ A - The system/function is not the scope of the Maintenance Rule.

☐ B - The even was a failure of a redundant component within a redundant train - no Maintenance Rule function was lost.

☐ C - The even was a failure of an installed spare or swing component which was not configured as an operating component - no Maintenance Rule function was lost.

☐ D - The failure was identified through post maintenance testing and is directly related to maintenance performed.

☐ E - An engineering evaluation has demonstrated the function was available even though not meeting other requirements such as Tech. Specs. Ref

Fig. 6

KSMRDB

| |
|---|
| FLOW CHART |
| Mail Log |
| Guidelines |
| Function Scope |
| Function Scoping Log |
| Function Equipment |
| Function Failure |
| Unavailability |
| Performance Evaluation |
| (a)(1) Status |
| MREP Meeting |
| Quit |

153

Function Failure Checklist

A · Performance Criteria of Functional Failure [2] counts.

current counts of #1 [0]

current counts of #2 [0]

B · Performance Criteria of Unavailability [N/A] hours current out of service hours of #1 [0]

current out of service hours of #2 [0]

O Yes O No  C · The functional failure should not be considered Maintenance Preventable (Rationale must be submitted to the MREP for review and approval)

☐ a · The FF occurred as a result of normal plant operating procedures, and not related to any maintenance, surveillance, or testing activities.

☐ b · The FF occurred due to a design deficiency not previously identified at MS plant or Through a review of related industry operating information.

☐ c · The equipment that failed is included in an approved run-to-failure analysis.

Monitoring Result

MSMRDB

- FLOW CHART
- Mail Log
- Guidelines
- Function Scope
- Function Scoping Log
- Function Equipment
- Function Failure
- Unavailability
- Performance Evaluation
- (a)(1) Status
- MREP Meeting
- Quit Duration: 2006/07/01 00:00 ~ 2008/01/03 23:59  Create Eval. Quit Unit: 1

Unavailability

| | Fun ID | Fun Name | Train | PC | OOS hours | Curve |
|---|---|---|---|---|---|---|
| ☐ | BC-05 | RCS COPS | B | 100 | 49.32 | Cure |
| ☐ | GJ-01 | Essential Chiller, Pump and Compression Tank | B | 200 | 84.48 | Cure |
| ☐ | NK-01 | NJ 125 VDC power supply | N/A | 100 | 133.83 | Cure |
| ☐ | PE-01 | emergency 4160V power supply to PB busses | N/A | 100 | 3.58 | Cure |

Reliability

| | Fun ID | Fun Name | Train | PC | OOS hours |
|---|---|---|---|---|---|
| ☐ | AN-05 | Auxiliary Feedwater system standby water source | | 2 | 1 |
| ☐ | BC-02 | ECCS function | B | 1 | 1 |
| ☐ | BC-05 | RCS COPS | A | 1 | 1 |
| ☐ | BC-05 | RCS COPS | B | 1 | 1 |
| ☐ | BH-07 | boron concentration maintaining during refueling | | 2 | 2 |
| ☐ | GG-03 | fuel building Emergency ventilation | | 2 | 1 |
| ☐ | GJ-01 | Essential Chiller, Pump and Compression Tank | B | 2 | 1 |
| ☐ | GT-03 | containment isolation | | 2 | 1 |

Fig. 8

MSMRDB

| FLOW CHART |
|---|
| Mail Log |
| Guidelines |
| Function Scope |
| Function Scoping Log |
| Function Equipment |
| Function Failure |
| Unavailability |
| Performance Evaluation |
| (a)(1) Status |
| MREP Meeting |
| Quit |

Performance Evalution — 17

[ Sys Eng Eval. ]  [ Monitoring Result ]  [ MRC ]  [ History ]  [ Create Eval. ]

[ Display all ]  [ Query ]  [ Backlog ]

| Unit | Fun ID | Fun Name | Train | Eval. Date | Status | Sys Eng | Approval | View |
|---|---|---|---|---|---|---|---|---|
| 2 | AB-01 | power generation | | 2006/12/04 08:00 | (a)(2) | Gao Qi | Approval | View |
| 1 | AB-01 | power generation | | 2006/12/04 08:00 | (a)(2) | Gao Qi | Approval | View |
| 1 | AB-02 | steam bypass | | 2006/12/04 08:00 | (a)(2) | Gao Qi | Approval | View |
| 2 | AB-02 | steam bypass | | 2006/12/04 08:00 | (a)(2) | Gao Qi | Approval | View |
| 2 | AB-03 | controlled decay heat removal | | 2006/12/04 08:00 | (a)(2) | Gao Qi | Approval | View |
| 1 | AB-03 | controlled decay heat removal | | 2006/12/04 08:00 | (a)(2) | Gao Qi | Approval | View |
| 2 | AB-03 | overpressure protection | | 2006/12/04 08:00 | (a)(2) | Gao Qi | Approval | View |

Fig. 9

(a)(1) Status

| Send | Unit | Report No | Fun ID | Fun Name | (a)(1) Date | Reporter | Approval | View | Download | Upload |
|---|---|---|---|---|---|---|---|---|---|---|
|  | 1 | 1-9601 | AL-01 | MDAFWP | 2007/01/05 00:00 | Wang Yu-min | New report | View | Download |  |
|  | 1 | 1-9602 | BG-03 | RCP seal | 2007/01/05 00:00 | Zhang Yi-wei | New report | View | Download |  |
|  | 1 | 1-9603 | BG-04 | containment isolation | 2007/01/05 00:00 | Zhang Yi-wei | New report | View | Download |  |
|  | 1 | 1-9604 | EF-01 | NSCW non-safety-related loads | 2007/01/05 00:00 | Huang Shui-sheng | New report | View | Download |  |
|  | 1 | 1-9605 | EF-02 | NSCW safety-related loads | 2007/01/05 00:00 | Wang Tsung-jung | New report | View | Download |  |
|  | 1 | 1-9606 | GG-03 | fuel building normal ventilation isolation | 2007/01/10 00:00 | Zhang Rong-ji | New report | View | Download |  |

Send [ ]   MRC [ ]   Display all   Backlog

Current   History   Approaching   al Template

MSMRDB

- FLOW CHART
- Mail Log
- Guidelines
- Function Scope
- Function Scoping Log
- Function Equipment
- Function Failure
- Unavailability
- Performance Evaluation
- (a)(1) Status
- MREP Meeting
- Quit

Fig. 10

APPARATUS FOR MONITORING THE MAINTENANCE OF SYSTEMS IN A NUCLEAR POWER PLANT

FIELD OF THE INVENTION

The present invention relates to an apparatus for monitoring the maintenance of equipment and, more particularly, to an apparatus for using the Probabilistic Risk Assessment ("PRA") method to classify the systems of a nuclear power plant according to their importance and monitor the systems on various levels.

DESCRIPTION OF THE RELATED ARTS

As the technology develops, the use of electricity becomes common. Electricity is used for appliances and devices in various aspects of our life. Once the electricity is interrupted, our life will be interrupted, too. It is therefore important for a power plant to supply electricity constantly.

After finding that reactor trips or unplanned capacity losses are related to the maintenance of the equipment in nuclear power plants, the U.S. Nuclear Regulatory Commission (NRC) announced 10 CFR 50.65 in 1991 to provide guidelines for monitoring the maintenance of the equipment in nuclear power plants. Since then, U.S. nuclear power plants have been working on stand-alone systems to manage the databases of maintenance-related regulations.

The present invention is therefore intended to obviate or at least alleviate the problems encountered in prior art.

SUMMARY OF THE INVENTION

It is the primary objective of the present invention to provide an apparatus for monitoring the maintenance of systems in a nuclear power plant to ensure the effectiveness of the maintenance, increase the reliability of the systems, reduce the probability of unplanned capacity losses or reactor trips and increase the safety of the systems.

To achieve the foregoing objective, the apparatus includes a screening module, a classifying module, a performance criteria-setting module, an availability data module, a reliability data module, a real-time monitoring module, a performance-assessing module and a special monitoring module. The screening module defines the function of each of the systems and accordingly screens the systems. The classifying module determines the importance of each of the systems and accordingly classifies the systems so that the systems can be subjected to various levels of monitoring. The performance criteria-setting module sets performance criteria for each of the levels of monitoring. The availability data module records the status and hours of the non-availability of each of the systems. The reliability data module determines whether any of the systems fails. The real-time monitoring module monitors the availability data module and the reliability data module and determines whether any of availability and reliability limits is reached. The performance-assessing module receives information from the real-time monitoring module, accordingly monitors the trend of the function of each of the systems and corrects any ineffective activity of the maintenance. The special monitoring module receives information from the performance-assessing module, executes special monitoring on any of the systems if necessary and returns the system to the performance-assessing module if the system reaches the performance criteria again.

Other objectives, advantages and features of the present invention will become apparent from the following description referring to the attached drawings.

BRIEF DESCRIPTION OF THE DRAWINGS

The present invention will be described through the detailed illustration of the preferred embodiment referring to the drawings.

FIG. 3 is a table for use in a screening module of the apparatus shown in FIG. 1.

FIG. 4 is a table for use in an availability data module of the apparatus shown in FIG. 1.

FIG. 6 is a table for use in a non-functional failure-determining unit of the reliability data module shown in FIG. 2.

FIG. 7 is a table for use in a functional failure-determining unit of the reliability data module shown in FIG. 2.

FIG. 8 is a table for use in a real-time monitoring module of the apparatus shown in FIG. 1.

FIG. 9 is a table for use in a performance-assessing module of the apparatus shown in FIG. 1.

FIG. 10 is a table for use in a special monitoring module of the apparatus shown in FIG. 1.

DETAILED DESCRIPTION OF EMBODIMENT

Figure 1:
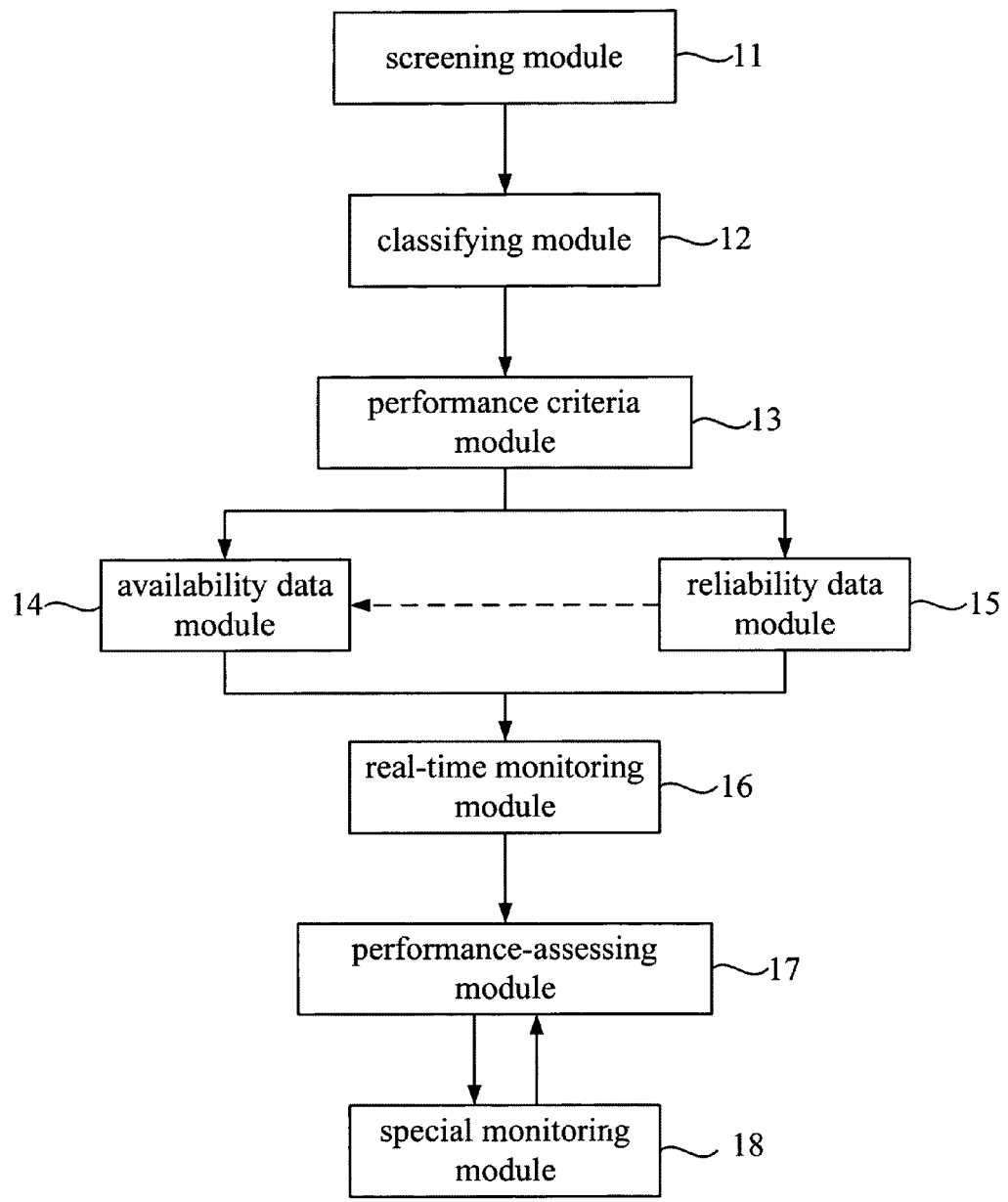
FIG. 1 is a block diagram of an apparatus for monitoring the maintenance of systems in a nuclear power plant according to the preferred embodiment of the present invention.

Referring to FIG. 1, there is shown an apparatus for monitoring the maintenance of systems in a nuclear power plant according to the preferred embodiment of the present invention. The apparatus includes a screening module 11, a classifying module 12, a performance criteria module 13, an availability data module 14, a reliability data module 15, a real-time monitoring module 16, a performance-assessing module 17 and a special monitoring module 18.

Referring to FIG. 3, the screening module 11 screens any systems that are not needed in the operation of the nuclear power plant according to a list of systems for renewal of licenses. The not-needed systems include drawings, virtual systems, tests before the commercial operation and washing systems. The screening module defines the functions of the needed systems. The screening module 11 determines whether each of the needed systems falls in the scope of monitoring under the USNRC 10 CFR 50.65.

Based on the Probabilistic Risk Assessment ("PRA") method, the classifying module 12 calculates the importance for each of the systems which are modeled in the nuclear power plant. Any system with obvious probabilistic risks would be given high importance and subjected to train-level monitoring. Otherwise, a system would be given low importance. A system given low importance will be subjected to system-level monitoring if it is a standby one. A system given low importance would be subjected to plant-level monitoring if it is an active one. Thus, the systems are classified and subjected to various levels of monitoring. Performance criteria for the train-level monitoring include reliability and availability. Performance criteria for the system-level monitoring include reliability but not availability. Performance criteria for the plant-level monitoring do not include reliability and availability.

The performance criteria module 13 calculates the limit for the reliability of each system and sets performance criteria for the classification and the monitoring on various levels. The performance criteria module 13 executes a process including steps as follows:

At first, test procedures of the nuclear power plant are studied, and times and hours for which each of the equipments has been tested during the assessment are calculated based on the testing interval of the plant's procedures. The systems include air-operated valves, motor-operated valves, pumps, turbines, chillers and fans. The assessment generally lasts for 18 rolling months.

Then, the frequency distribution of times of failure of each of the needed systems is calculated by considering the failure rate of each of the needed system according to the binomial distribution, the Poisson distribution or their combination.

If the frequency distribution of times of failure of a system exceeds 95%, it will be assumed that the system malfunctions. It will also be assumed that the maintenance of the system is not effective as expected. Therefore, the frequency distribution of times of failure of each system is set to be 95% in the performance criteria module 13.

Figure 4:
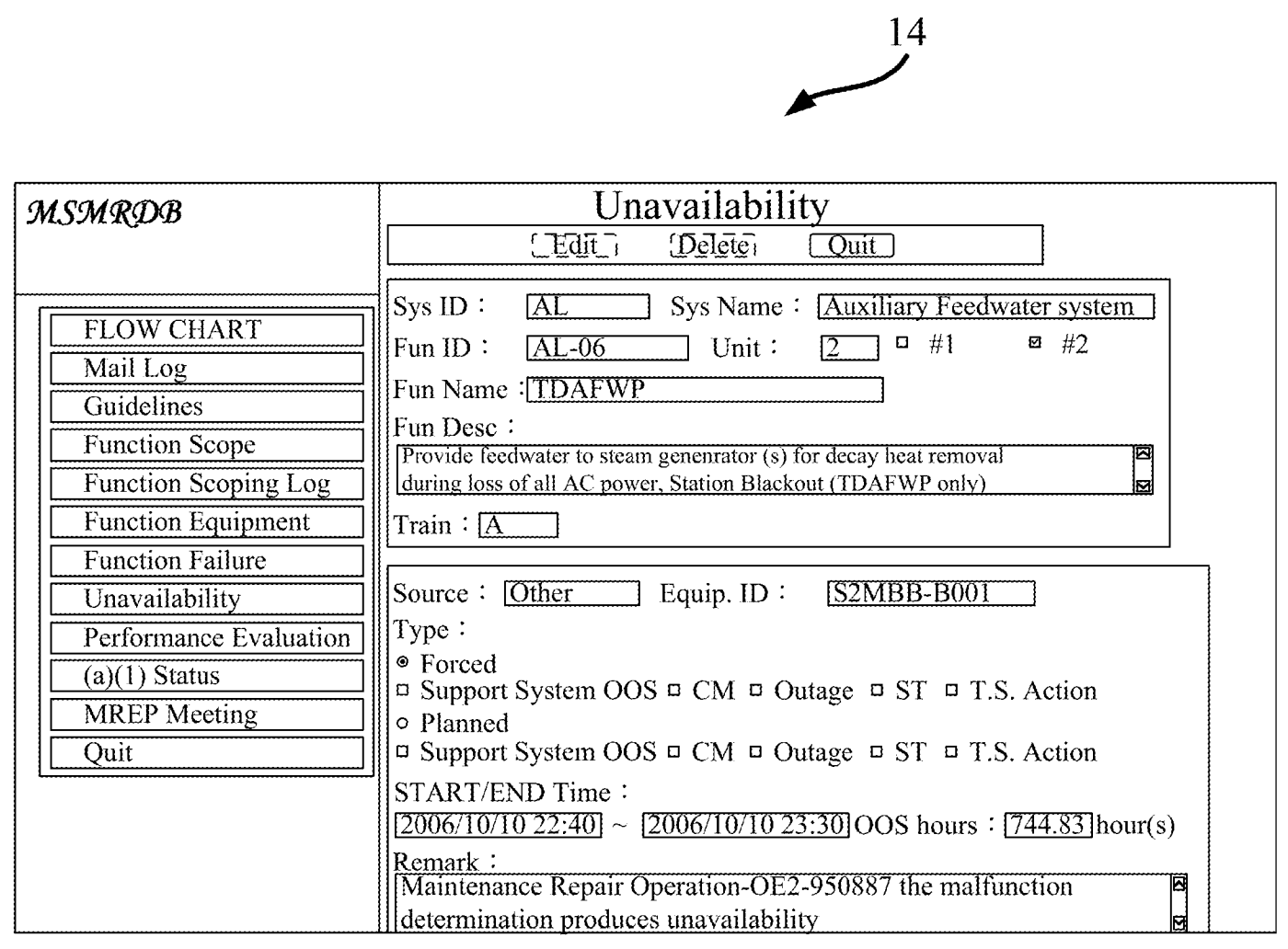

Referring to FIG. 4, the availability data module 14 records the types and hours of out of service for which each of the needed system, and sends related data to the real-time monitoring module 16. Accordingly, the real-time monitoring module 16 monitors the availability of each train. However, the reliability data module 15 provides some of the availability data.

Figure 2:
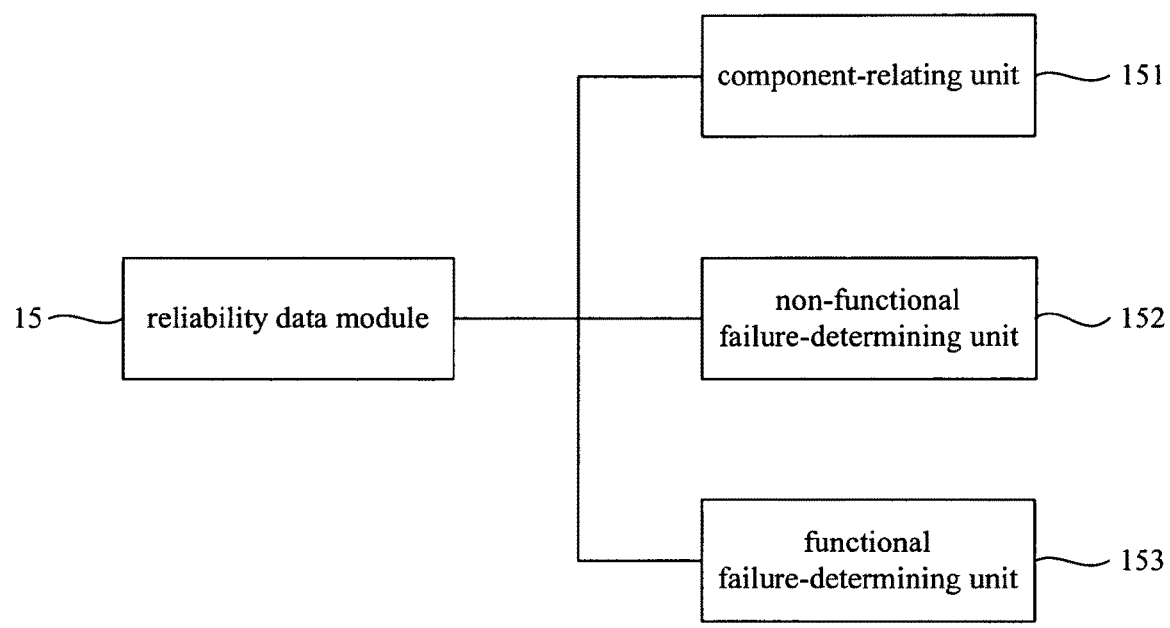
FIG. 2 is a block diagram of a reliability data module of the apparatus shown in FIG. 1.
Figure 5:
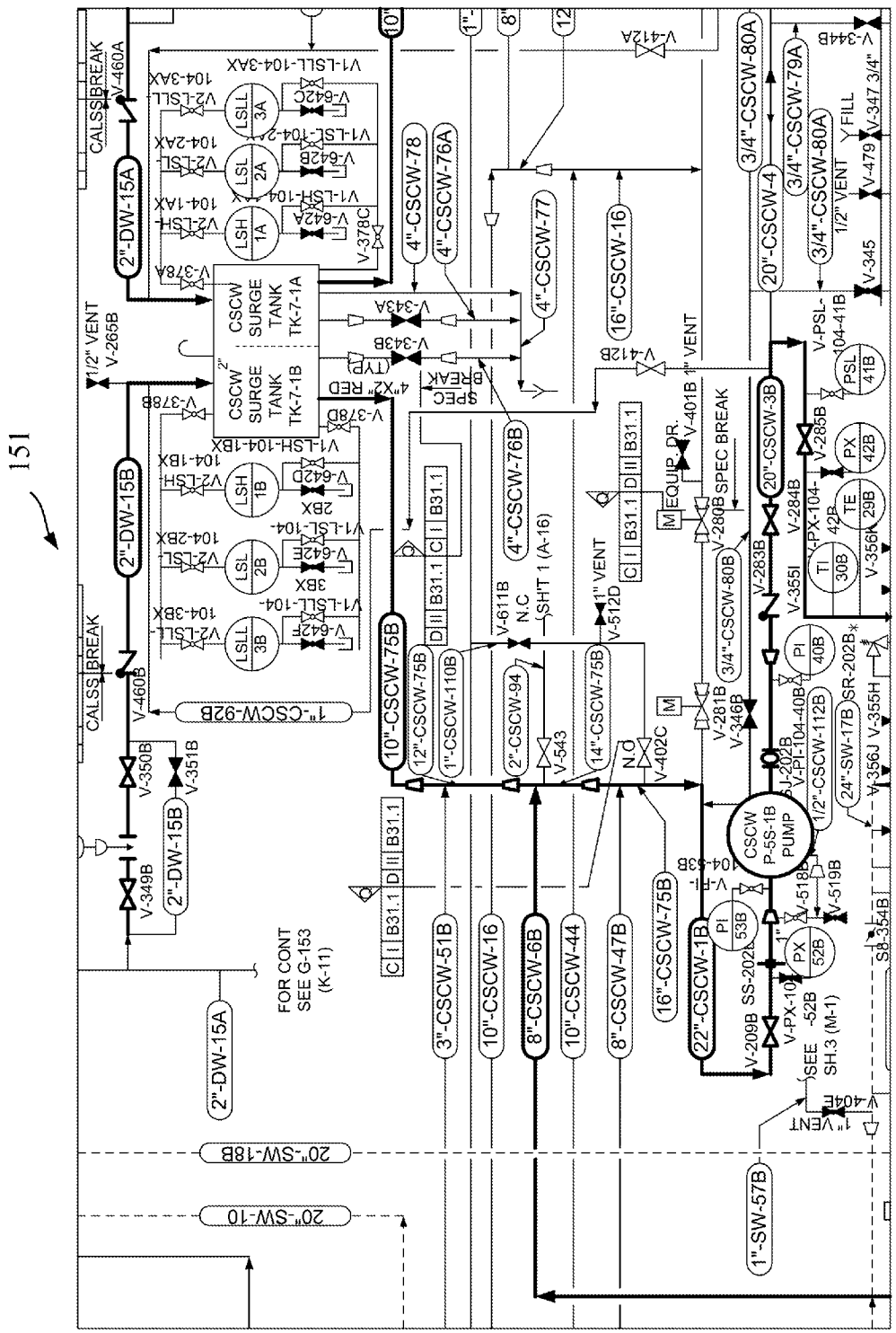
FIG. 5 is a chart for use in a component-relating unit of the reliability data module of the apparatus shown in FIG. 2.

Referring to FIG. 2, the reliability data module 15 includes a component-relating 151, a non-functional failure-determining unit 152 and a functional failure-determining unit 153. Referring to FIG. 5, the component-relating unit 151 builds all of the equipment on the flow path drawings of the systems for determining to which system a failed piece of equipment belongs. Referring to FIGS. 6 and 7, the non-functional failure-determining unit 152 and the functional failure-determining unit 153 determine whether a failed system falls in the scope of monitoring of the maintenance. Therefore, the reliability data module 15 determines whether the failure of a system is functional or not, and helps the real-time monitoring module 16 execute the reliability monitoring.

Referring to FIG. 8, the real-time monitoring module 16 executes several tasks. The first task is the real-time monitoring of the availability data module 14 and the reliability data module 15. The second task is to collect the functional information continuously. The third task is to count the hours and times of failure of each of the needed systems during the assessment for later tracking and comparison. The fourth task is to determine whether the limits for the availability and reliability set in the performance criteria module 13 have been reached. These tasks help the performance assessment module 17 assess the performance of each of the needed system.

The performance assessment module 17 receives information from the real-time monitoring module 16 and accordingly monitors the trends of the train-level, system-level and plant-level maintenance. The performance assessment module 17 instantly corrects the ineffective maintenance activities. The performance assessment module 17 provides information to the special monitoring module 18 if determining that a system is in need of special monitoring.

Based on the information from the performance assessment module 17, the special monitoring module 18 executes special monitoring of a system, and records the corrective actions and tracks the status, goals for the corrective action plan and the results of the monitoring of the goals. If the goals are reached, the special monitoring module 18 will return the system to the performance assessment module 17. Thus, the monitoring of the trends can continue so that the effects of the maintenance are under control.

The screening module 11 selects, from the systems, some related to the safety of the nuclear power plant. The classifying module 12 classifies the selected systems. Data are confirmed so that man power and resources can be focused on the selected systems. Thus, the probability of reactor trips or un-planned capacity losses because of the selected systems can be reduced. The criteria-setting module 13 sets the performance criteria for each level of monitoring so that the availability and reliability can be monitored and used as the basis for adjusting the items and periods of the maintenance and that excessive maintenance that would reduce the availability of the systems can be avoided. That is, the availability and the reliability are optimized.

The component-relating unit 151 of the reliability data module 15 builds and numbers the systems on the flow path drawings to help determining the functional failure. The real-time monitoring module 16 calculates the hours and times of failure. On determining that the hours or times of failure of a system exceed the performance criteria, the real-time monitoring module 16 turns the system to the performance-assessing module 17. The performance-assessing module 17 determines whether the system should be assigned to the special monitoring module 18.

As discussed above, the systems are monitored, the effects of the maintenance are ensured, the reliability of the systems is increased, the reactor trips and unplanned capacity losses are reduced and the safety of the systems is increased. Moreover, because the availability and the reliability are balanced, the time of maintenance is reduced while the efficiency of the generation of electricity is increased.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for monitoring the maintenance of a plant equipped with various systems, the apparatus comprising:
   a screening module for defining the function of each of the systems and accordingly screening the systems;
   a classifying module for determining the importance of each of the systems and accordingly classifying the systems so that the systems can be subjected to various levels of monitoring;
   a performance criteria-setting module for setting performance criteria for each of the levels of monitoring;
   an availability data module for recording the status and hours of the unavailability of each of the systems;
   a reliability data module for determining whether any of the systems fails;
   a real-time monitoring module for monitoring the availability data module and the reliability data module and determining whether any of availability and reliability limits is reached;
   a performance-assessing module for receiving information from the real-time monitoring module, accordingly monitoring the trend of the function of each of the systems and correcting any ineffective activity of the maintenance based on coals of a corrective action plan; and
   a special monitoring module for receiving information from the performance-assessing module, executing special monitoring on any of the systems if necessary and returning the system to be monitored by the performance-assessing module if the system reaches the goals for the corrective action plan again.

2. The apparatus according to claim 1, wherein the screening module operates based on a list of systems for renewal of licenses.

3. The apparatus according to claim 1, wherein the screening module screens the systems based on USNRC 10 CFR 50.65 statements b(1) and b(2).

4. The apparatus according to claim 1, wherein the classifying module determines the importance of each of the systems according to the Probabilistic Risk Assessment method.

5. The apparatus according to claim 1, wherein important ones of the systems are subjected to the train-level monitoring, non-important standby ones of the systems are subjected to the system-level monitoring, and non-important active ones of the systems are subjected to the plant-level monitoring.

6. The apparatus according to claim 5, wherein the performance criteria for the train-level monitoring comprise criteria related to the reliability and availability.

7. The apparatus according to claim 5, wherein the performance criteria for the system-level monitoring comprise a criterion related to the reliability.

8. The apparatus according to claim 5, wherein the performance criteria for the plant-level monitoring do not comprise criteria related to the reliability and availability.

9. The apparatus according to claim 1, wherein the performance-assessing module sets the performance criteria according to a method comprising the steps of:
    calculating times and hours for which each of the systems is needed during the assessment based on the testing interval of the plant's procedures; and
    determining the frequency distribution of times of failure for each of the systems via considering the failure rate of each of the systems according to the binomial distribution, the Poisson distribution or their combination.

10. The apparatus according to claim 9, wherein the equipments include air-operated valves, motor-operated valves, pumps, turbines, chillers and fans.

11. The apparatus according to claim 1, wherein the performance criteria comprises a criterion related to reliability in term of the frequency distribution of the times of failure of 95%.

12. The apparatus according to claim 1, wherein the reliability module produces some non-availability data.

13. The apparatus according to claim 1, wherein the reliability data module comprises a component-relating unit, a non-functional failure-determining unit and a functional failure-determining unit.

14. The apparatus according to claim 13, wherein the component-relating unit builds the equipments of the systems on a flow path chart for each of the systems for preliminary determination of any failed one of the equipments.

15. The apparatus according to claim 13, wherein the non-functional failure-determining unit and the functional failure-determining unit help to determine whether any failed one of the equipments falls in the scope of monitoring.

16. The apparatus according to claim 1, wherein the real-time monitoring module constantly collects functional information and calculates the hours and times of failure of each of the systems during the assessment for tracking and comparison.

17. The apparatus according to claim 1, wherein the performance-assessing module executes train-level assessment, system-level assessment and plant-level assessment.

18. The apparatus according to claim 1, wherein the performance-assessing module gathers data for any of the systems in need of the special monitoring.

19. The apparatus according to claim 1, wherein the special monitoring system records corrective actions, the status of tracking, the goals for the corrective action plan and results of the monitoring of the goals.

* * * * *